(12) United States Patent
Blohm et al.

(10) Patent No.: US 12,724,849 B2
(45) Date of Patent: Sep. 1, 2026

(54) SYSTEMS FOR APPLICATION ENHANCED DATA LABELING FOR AI TRAINING AND METHODS THEREOF

(71) Applicant: Resideo USA LLC, Golden Valley, MN (US)

(72) Inventors: Andrew Blohm, Washington, DC (US); Louis Tremblay, Goleta, CA (US); James T. Woolaway, Carbondale, CO (US)

(73) Assignee: Resideo USA LLC, Golden Valley, MN (US)

( * ) Notice: Subject to any disclaimer, the term of this patent is extended or adjusted under 35 U.S.C. 154(b) by 0 days.

(21) Appl. No.: 18/869,159

(22) PCT Filed: Jun. 6, 2023

(86) PCT No.: PCT/US2023/068001
§ 371 (c)(1),
(2) Date: Nov. 25, 2024

(87) PCT Pub. No.: WO2023/240087
PCT Pub. Date: Dec. 14, 2023

(65) Prior Publication Data

US 2025/0322038 A1 Oct. 16, 2025

Related U.S. Application Data

(60) Provisional application No. 63/349,564, filed on Jun. 6, 2022.

(51) Int. Cl.
*G06F 17/00* (2019.01)
*G06F 18/241* (2023.01)
*G06N 20/00* (2019.01)

(52) U.S. Cl.
CPC .......... *G06F 18/241* (2023.01); *G06N 20/00* (2019.01)

(58) Field of Classification Search
CPC ........ G06F 18/241; G06N 20/00; G06N 3/09; G06Q 10/20
See application file for complete search history.

(56) References Cited

U.S. PATENT DOCUMENTS 10,410,135 B2 9/2019 Shumpert
10,693,900 B2 6/2020 Zadeh et al.
(Continued)

OTHER PUBLICATIONS

International Search Report and Written Opinion in PCT International Application No. PCT/US2023/068001 mailed Sep. 25, 2023.
(Continued)

*Primary Examiner* — Greta L Robinson
(74) *Attorney, Agent, or Firm* — Greenberg Traurig, LLP; Ryan D. Sharp; David J. Dykeman

(57) ABSTRACT

For deployed products containing AI models, environmental effects or failures may occur that cause the AI to detect an event that is not recognized. In these cases, it may be necessary to identify the nature of the event that triggered the AI process to output an unknown or anomalous event. This can be difficult as the product may be in operation and deployed for use in a residential or commercial setting. By identifying the nature of the event, and labeling it along with the associated data, the AI model can be retrained to allow it to properly recognize these events in the future. To facilitate this a smart phone application is disclosed that provides connectivity to critical event information, to event labeling, and to the model retraining process.

20 Claims, 8 Drawing Sheets

(56) References Cited

U.S. PATENT DOCUMENTS

| | | | | |
|---|---|---|---|---|
| 11,631,014 | B2 * | 4/2023 | Stocker | G06N 5/04 706/11 |
| 11,941,599 | B2 * | 3/2024 | Daruna | G06N 20/00 |
| 2019/0340554 | A1 * | 11/2019 | Dotan-Cohen | G06Q 10/06313 |
| 2019/0340684 | A1 * | 11/2019 | Belanger | G06N 20/00 |
| 2020/0342988 | A1 | 10/2020 | Lymperopoulos et al. | |
| 2021/0133607 | A1 | 5/2021 | Stubbs et al. | |

OTHER PUBLICATIONS

Ruben Sipos et al, "Log-based predictive maintenance", Knowledge Discovery and Data Mining, ACM, 2 Penn Plaza, Suite 701 New York NY 10121-0701 USA, Aug. 24, 2014 (Aug. 24, 2014), pp. 1867-1876.

Khaldi Yacine et al, "Ear Recognition Based on Deep Unsupervised Active Learning", IEEE Sensors Journal, vol. 21, No. 18, Jul. 26, 2021, pp. 20704-20713.

* cited by examiner

SYSTEMS FOR APPLICATION ENHANCED DATA LABELING FOR AI TRAINING AND METHODS THEREOF

CROSS REFERENCE TO RELATED APPLICATIONS

This application is a U.S. National Phase patent application under 35 U.S.C. § 371 of International Application No. PCT/US2023/068001, filed Jun. 6, 2023, which claims the benefit of, and priority to, U.S. Provisional Patent Application No. 63/349,564 filed Jun. 6, 2022, the entire contents of each of which is are incorporated herein by reference.

TECHNICAL FIELD

The present disclosure describes systems for improved artificial intelligence training using enhanced data labeling and methods thereof.

BACKGROUND

Artificial intelligence (AI) is being used in a wide range of applications for the control, operation and monitoring of systems used in commercial and domestic environments. For many of these systems, one or more sensors data are processed through electronics and then through an AI model. The AI model process typically uses trained models that are developed to identify a particular characteristic, feature, or signature in the sensor data. These models are developed through training the AI model with data sets representative of the area that the AI data process is desired to be responsive to. This training may be performed prior to the deployment of the AI in a product or application, may be done after deployment (edge training), or by a combination of these two methods where the secondary edge training can produce further refinement to the performance of the initial AI model.

The training process generally is performed through an iterative process using a large number of data sets. Here, each data set is labeled as to the nature for that specific data set.

For example, an AI application that may be designed to identify a specific failure mode in a home appliance, may include labeled sensor data training sets for normal operation as well as data sets for conditions where irregular operation or failures are present. Labeled data sets for a range or normal operation, and the irregular operational cases are needed, to train for these cases. The processed results generate a trained model.

SUMMARY OF THE DISCLOSURE

In general, this disclosure describes methods for training, or refining the training, for AI models contained in deployed products. Products may contain AI to perform a number of functions such as for control, operation and monitoring of systems and may be used in commercial and domestic environments. The AI models within these, can be the representation of model training from thousands of labeled data sets. It is typical, however, that even with this extensive training, that environmental factors, or unanticipated equipment issues may produce anomalous results when processed through the AI processor. In these situations, it is desirable to identify the cause and label for the anomalous data and to retrain the model to include it.

Specifically, this disclosure pertains to a method for facilitating the identification of the anomalous data and the process of labeling it. Central to this method is the use of a smart phone application where the application provides a communication path to the details of the anomalous event and to the labeling process for the event. Here details for the event are provided, such as that an anomalous event was detected, where it was detected, at what time, and the data for the event. This information is intended to give a technician the details needed to visit the site and diagnose the event. Once the event has been diagnosed, the application then provides a number of predetermined and or custom labels that if selected will be associated with the event data as training labels.

DETAILED DESCRIPTION

Artificial Intelligence (AI) is becoming increasingly common in the home and in commercial environments. In part, this is the result of the use of products and appliances that are integrating AI technology to allow these products to perform better than previous generations. As an example, a product may be using AI to control a temperature set point, where in previous generations, fixed control circuitry controlled the set point. Through the use of AI, the temperature setpoint can be adaptively controlled, allowing the product to achieve a more ideal control. AI is also being used to monitor the operation of these products and appliances. This gives these products the ability to self-diagnose failures or failure trends in their operation.

For products containing AI, large labeled data sets are often required for the training process. Additionally, labeled data for a wide range of normal operational conditions as well as for failing conditions is desirable as this allows the trained model to test for these conditions. Products containing these pretrained AI models are deployed for field use and the performance level for the AI models, unless changed, can be limited by their initial trained state. If an environmental effect or equipment failure occurs that was not trained for in the initial training it is unlikely that the AI model will correctly identify it. To address the technological problem of training for unexpected scenarios, a technological solution includes retraining and updating anomaly detection and/or classification models over time as unexpected scenarios are diagnosed. For example, records of servicing, repair and/or maintenance of equipment can be linked to equipment behavior data to train the anomaly detection and/or classification models as service, repair and/or maintenance is performed. This allows for equipment failure or maintenance signatures to be collected and applied to retraining of the AI models making future identification and/or predicting or forecasting of these conditions and repairs possible.

Additionally, the technological solution may include using AI designs that support the collection and retraining of the AI model in a deployed equipment state ("edge training"). Edge training has the advantage that small nuances and or differences in the data that can occur for the deployed product due to location or environmental changes, can be addressed through model retraining. This process can work in concert with the large data set that has already been trained and can simply incrementally update the model to better function at the edge, e.g., using the records of servicing, repair and/or maintenance of equipment.

Figure 1:
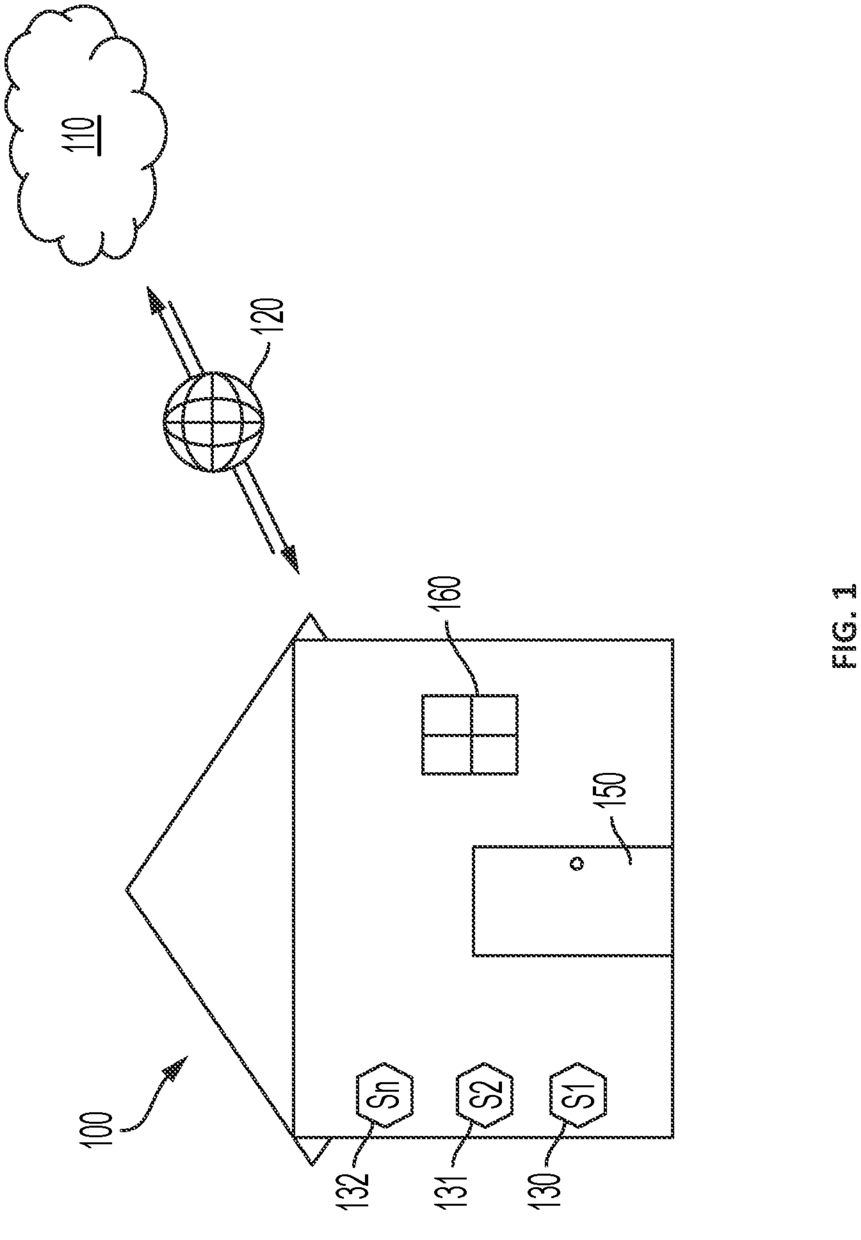
FIG. 1 is a diagram illustrating a building structure containing one or more products with an embedded AI processor, in accordance with one or more embodiments of the present disclosure.

FIG. 1. illustrates one of many possible edge AI system configurations. Here a structure 100 (such as, e.g., a building, house, apartment, office, office building, warehouse, brick-and-mortar store, etc.) is shown to contain a door 150 and window 160. Also contained in the structure 100 are n number of sensors, e.g., sensor S1 130, sensor S2 131, through sensor Sn 132.

In some embodiments, each of the sensors S1 130 through sensor Sn 132 may be paired, positioned or otherwise associated with one or more particular equipment hardware, such as with, e.g., a home appliance (washer, dryer, oven, stove, range, microwave, heating-ventilation-air-condition (HVAC) system, smart lighting, smart thermostat, water heater, dishwasher, electricity meter, power generator, etc.), building appliance and/or infrastructure (oven, stove, range, microwave, heating-ventilation-air-condition (HVAC) system, smart lighting, smart thermostat, water heater, dishwasher, electricity meter, power generator, etc.), or any other suitable equipment or any combination thereof. For example, the equipment may be specified in a suitable data field in sensor settings and/or sensor metadata associated with the sensors S1 130 through sensor Sn 132.

In some embodiments, the sensors S1 130 through sensor Sn 132 may be paired, positioned or otherwise associated with a particular location, such as with the structure 100 and/or with a particular position within the structure 100. For example, the location may be specified via a suitable data field in sensor settings and/or in a user profile associated with the sensors S1 130 through sensor Sn 132.

In some embodiments, the sensor S1 130 through sensor Sn 132 may collect sensor data including location-specific sensor data and/or equipment-sensor data. The sensor data may include, e.g., equipment state measurements (e.g., operational state, settings, power draw, voltage draw, current draw, etc.), environmental measurements (e.g., weather, temperature, noise level, light intensity, etc.), among other sensor data or any combination thereof.

In some embodiments, the sensor S1 130 through sensor Sn 132 may detect the presence and/or movement of user devices within the proximity of each sensor S1 130 through sensor Sn 132. The sensor S1 130 through sensor Sn 132 may perform such detections using built-in radios that communicate or otherwise interact with the user devices via, e.g., data communication, electromagnetic field detection, cellular and/or Wifi and/or Bluetooth signal detection, among other techniques for detecting user devices. In some embodiments, the sensor S1 130 through sensor Sn 132 may be configured to communicate with each user device via a suitable wireless communication technology. For example, the sensor S1 130 through sensor Sn 132 may communicate with user devices via, e.g., Near Field Communication (NFC), radio frequency identification (RFID), ultra-wide band (UWB), Bluetooth, Wifi, or other wireless communication technology or any combination thereof. In some embodiments, the sensor S1 130 through sensor Sn 132 may utilize the wireless communication technology to detect the presence of a user device within the predetermined range and/or to exchange data wirelessly with the user device within the predetermined range.

In some embodiments, the sensor S1 130 through sensor Sn 132 may provide a network 120 of access points for user devices to communicate with each other and/or with one or more remote services, such as cloud services or other server hosted software (e.g., a webpage, a content delivery network, a messaging service, etc.). Accordingly, the sensor S1 130 through sensor Sn 132 may be connected to a computer network 120 such as the internet or an intranet, or a local area network, or other computer network. The sensor S1 130 through sensor Sn 132 may communicate with one or more remote computing systems, including cloud platforms, servers, databases, mainframes, remote user devices, among other remote computing devices and systems of remote computing devices or any combination thereof.

In some embodiments, the network 120 may include any suitable computer network 120, including, two or more computers that are connected with one another for the purpose of communicating data electronically. In some embodiments, the network 120 may include a suitable network type, such as, e.g., a local-area network (LAN), a wide-area network (WAN) or other suitable type. In some embodiments, a LAN may connect computers and peripheral devices in a physical area, such as a business office, laboratory, or college campus, by means of links (wires, Ethernet cables, fiber optics, wireless such as Wi-Fi, etc.) that transmit data. In some embodiments, a LAN may include two or more personal computers, printers, and high-capacity disk-storage devices called file servers, which enable each computer on the network 120 to access a common set of files. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, or other wide-area connection means. In some embodiments, an example of a WAN may include the Internet.

In some embodiments, the sensor S1 130 through sensor Sn 132 may be connected to the network 120 using a suitable networking technology. The networking technology may include, e.g., WiFi, Bluetooth, Zigbee, Z-Wave, Ethernet, or any other networking technology or any combination thereof. Accordingly, the sensor S1 130 through sensor Sn 132 may include or be in communication with a transmitter, receiver and/or transceiver to interface with the network 120 via the networking technology.

In some embodiments, the sensor S1 130 through sensor Sn 132 may include computer memory storing pretrained AI models, e.g., for performing specific functions. As an example, the sensor S1 130 through sensor Sn 132 sensors may be audio sensors with pretrained AI models that are pretrained to detect the sound of a baby crying. In this case, they may indicate a light or some other action to alert that they have detected the trained sound of a baby crying. Indoor and outdoor air quality sensors (AIQ and OIQ) may be configured to detect the air quality for their respective locations. They may act on the air quality data to control various systems for example fans, HVAC, and filtering systems. Similarly, water quality sensors may collect water quality data that can be used to control water systems such as water filters. In some embodiments, the sensor S1 130 through sensor Sn 132 may be electrical sensors (e.g., voltmeter, ammeter, electrical power meter, etc.) connected to the IoT device and/or equipment to sense electrical usage. The pretrained AI models may be pretrained to detect anomalous electrical usage (e.g., indicating a fault or improper usage of the IoT device and/or equipment).

In some embodiments, the sensor S1 130 through sensor Sn 132 may upload sensor data via the network 120 to cloud computing platform 110 or other suitable remote compute resource, including, e.g., at least one user computing device separate from the sensor S1 130 through sensor Sn 132, at least one server, or other suitable compute resource or any combination thereof. In some embodiments, the sensor data may be uploaded in real-time or after a delay and may include, e.g., a continuous stream of time-series data, a periodic batch of time-series data, or any combination thereof.

In some embodiments, the sensor data may include, e.g., sensor measurements, output from the pretrained AI model (s), metadata (location, user identifier, user profile identifier, time associated with the sensor data, date associated with the sensor data, etc.), among other data. In some embodiments, the location may specify, e.g., a geospatial location associated with each of the sensor S1 130 through sensor Sn 132 (e.g., latitude-longitude), an address of the structure 100, a position within the structure 100 or any suitable combination thereof. In some embodiments, the time may include, e.g., a time associated with one or more time windows and/or segments of sensor data, a time associated with each sensor data point (e.g., each measurement, etc.), or any combination thereof. In some embodiments, the sensor data may include sensor data points collected at a suitable frequency, such as, e.g., 1 hertz (Hz), 2 Hz, 3 Hz, 4 Hz, 5 Hz, 6 Hz, 7 Hz, 8 Hz, 9 Hz, 10 Hz, 11 Hz, 12 Hz, 13 Hz, 14 Hz, 15 Hz, 20 Hz, 24 Hz, 30 Hz, 32 Hz, 60 Hz, 64 Hz, 90 Hz, 120 Hz, 128 Hz, 244 Hz, 256 Hz, 1 kilohertz (kHz), 2 kHz, 3 kHz, 4 kHz, 5 kHz, 6 kHz, 7 kHz, 8 kHz, 9 kHz, 10 kHz, 11 kHz, 12 kHz, 13 kHz, 14 kHz, 15 kHz, 20 kHz, 24 kHz, 30 kHz, 32 kHz, 60 kHz, 64 kHz, 90 kHz, 120 kHz, 128 kHz, 244 kHz, 256 kHz, or any other suitable frequency or any combination thereof.

In some embodiments, the output from the pretrained AI model(s) may include, e.g., anomaly detection indication for detected anomalous sensor data segments, anomaly classification labels for anomalous sensor data, detected audio, audio classification for detected audio, among other outputs produced by the pretrained AI model(s) of the sensor S1 130 through sensor Sn 132 or any combination thereof. In some embodiments, the output from the pretrained AI model(s) may be correlated to a particular segment or segments of the sensor data, such as a time window of sensor data associated with the output. Thus, the output may indicate timestamps associated with the output to match the output to timestamps recorded in the sensor data. Timestamps may also be used to match sensor and AI model output to equipment failure or maintenance event times so that data signatures for these can be identified and applied to retraining of the AI models.

Figure 2:
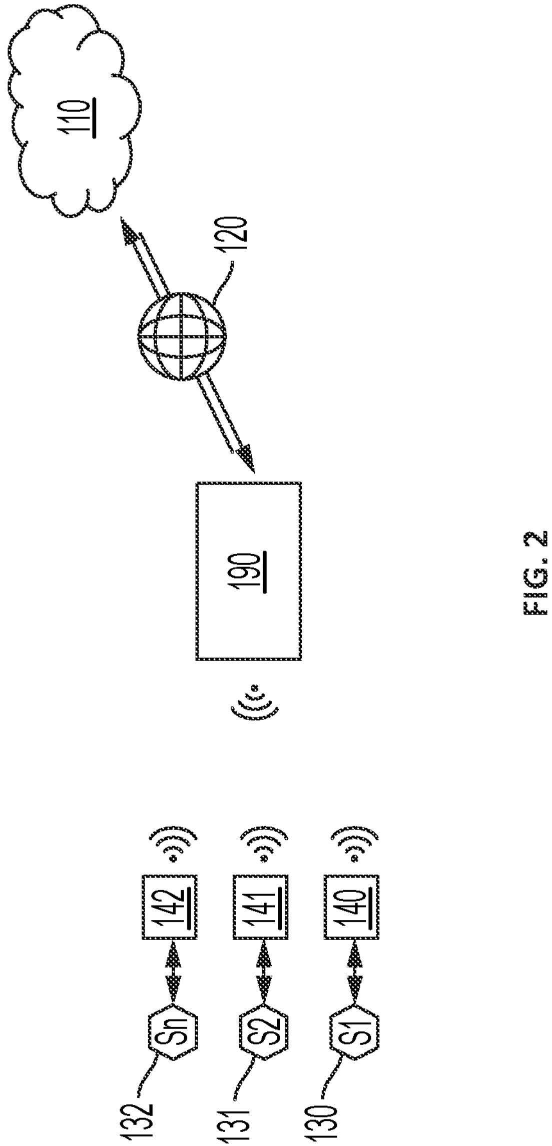
FIG. 2 is a diagram illustrating a environment containing one or more products with an embedded AI processor, in accordance with one or more embodiments of the present disclosure.

FIG. 2. illustrates and additional level of sophistication in the deployment of sensors S1, S2, and Sn. Here the sensors S1, S2, and Sn are shown to each interface to edge electronics 140, 141, and 142 respectively. Edge electronics 140, 141, and 142 may also support a WiFi or radio link interface. In some cases, this interface may be directly to an interface 190 such as a WiFi router, hub, or smart home controller. The AI process from FIG. 1, where the AI is processed at the sensor, may now be processed in the edge electronics 140, 141, 142, the interface 190, or in the cloud computing platform 110. It is advantageous to do the AI process at the edge electronics 140, 141, and 142 as this minimizes the amount of data that needs to be transmitted to either interface 190 or the cloud computing platform 110.

For the conditions of FIG. 1 or FIG. 2, where the AI process is performed at the sensor 130, 131, 132, or edge electronics 140, 141, 142, the performance of the AI model and algorithm can be limited to the current state of the model. It may be desirable to update the model with a better trained model and or retrain the model to extend the model and algorithm sensitivity to data and labels that were not previously trained. For the example in FIG. 2 where the edge electronics is WiFi connected it is possible to load new models into the edge electronics through the WiFi interface to alter the AI processing capabilities. The forementioned AI techniques and methods would be understood as common in the current state-of-the-art for AI processing and edge processing.

Figure 3:
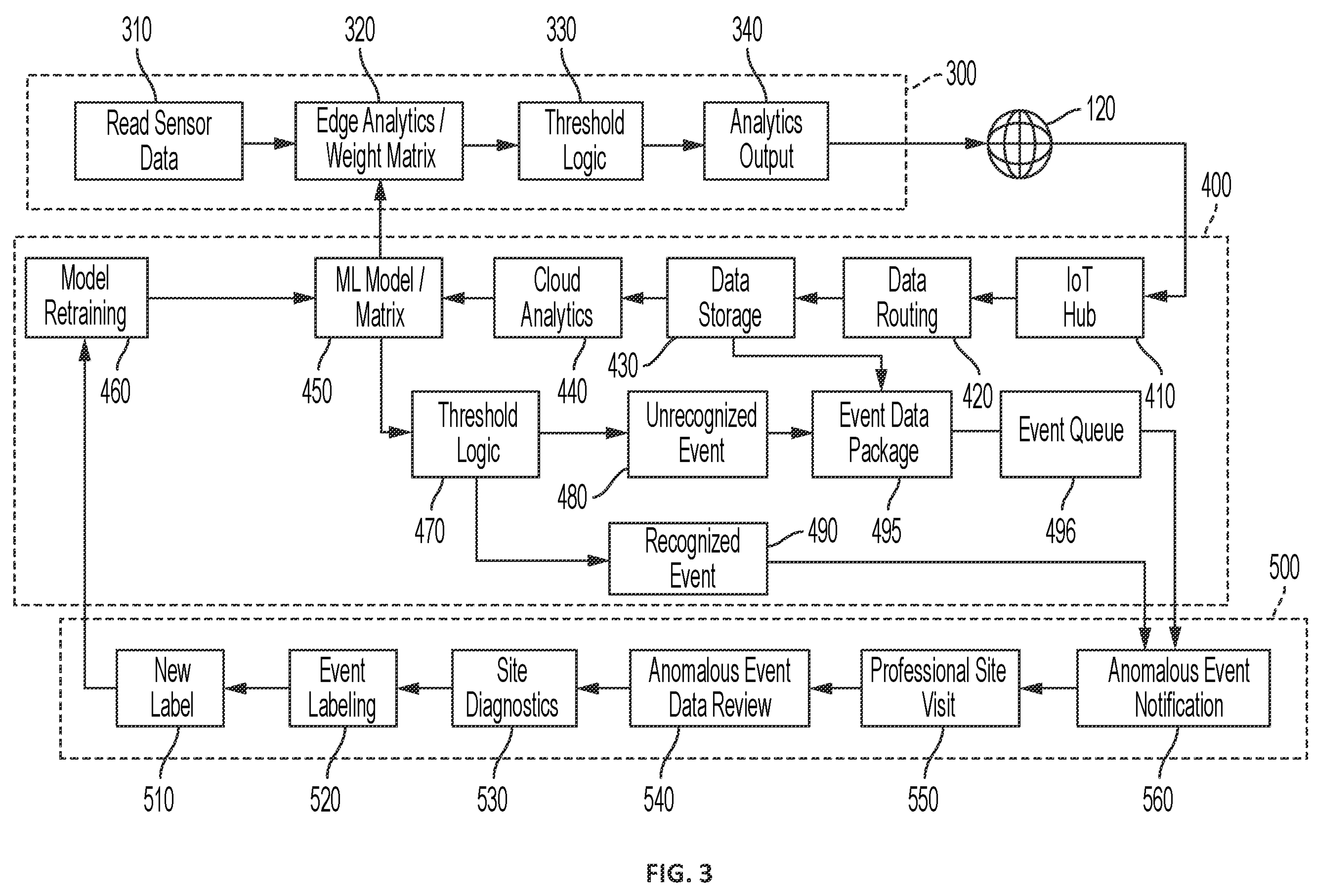
FIG. 3 is a flow diagram illustrating a process for developing and refining the AI model, in accordance with one or more embodiments of the present disclosure.

FIG. 3 illustrates the flow diagram incorporating the AI notification and labeling application 500. Three primary systems are illustrated here, the edge sensor electronics 300, cloud computing platform 400, and the notification and labeling application 500. Data from the edge sensor electronics is connected to the network 120 through traditional connection means such as WiFi, ethernet cable, router, or modem. Similarly, data from network 120 may connect to cloud computing platform 400. Cloud computing platform 400 may be configured to provide a number of computing and storage functions via one or more computing engines.

In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the hardware elements of the cloud computing platform 400 computing engines may include one or more datastores. The datastore(s) may include, e.g., a suitable memory or storage solutions for maintaining electronic data representing the activity histories for each account. For example, the datastore(s) may include database technology such as, e.g., a centralized or distributed database, cloud storage platform, decentralized system, server or server system, among other storage systems. In some embodiments, the datastore(s) may, additionally or alternatively, include one or more datastore(s) such as, e.g., a hard drive, solid-state drive, flash drive, or other suitable storage device. In some embodiments, the datastore(s) may, additionally or alternatively, include one or more temporary storage devices such as, e.g., a random-access memory, cache, buffer, or other suitable memory device, or any other data storage solution and combinations thereof.

In some embodiments, the term "database" refers to an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity-relationship database, an enhanced entity-relationship database, a document database, an entity-attribute-value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

Depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

The database may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

In some embodiments, a data flow for the sensor electronics, such as the electronics in the sensor S1 130 through sensor Sn 132, starts with a sensors signal carrying sensor data being read 310. In some embodiments, the sensor electronics may include any suitable electronics for performing measurements of the environment and/or equipment, such as, e.g., a voltmeter, an ammeter, a power meter, a gyroscope, an accelerometer, a thermometer, a barometer, a magnetometer, radar, light detection and ranging (LiDAR), an infrared (IR) sensor, among other sensor electronics or any combination thereof. In some embodiments, the sensor electronics may record sensor data including the measurements at a suitable sample frequency, such as, e.g., 1 hertz (Hz), 2 Hz, 3 Hz, 4 Hz, 5 Hz, 6 Hz, 7 Hz, 8 Hz, 9 Hz, 10

Hz, 11 Hz, 12 Hz, 13 Hz, 14 Hz, 15 Hz, 20 Hz, 24 Hz, 30 Hz, 32 Hz, 60 Hz, 64 Hz, 90 Hz, 120 Hz, 128 Hz, 244 Hz, 256 Hz, 1 kilohertz (kHz), 2 kHz, 3 kHz, 4 kHz, 5 kHz, 6 kHz, 7 kHz, 8 kHz, 9 kHz, 10 kHz, 11 kHz, 12 kHz, 13 kHz, 14 kHz, 15 kHz, 20 kHz, 24 kHz, 30 kHz, 32 kHz, 60 kHz, 64 kHz, 90 kHz, 120 kHz, 128 kHz, 244 kHz, 256 kHz, or any other suitable frequency or any combination thereof.

In some embodiments, the sensor data may be output as a time-series data stream including, e.g., a time stamp for each measurement and/or a timestamp for each window of sensor data or a predetermined time window size. In some embodiments, the time window size may be any suitable time window, such as, e.g., 1 second, 2 seconds, 3 seconds, 4 seconds, 5 seconds, 6 seconds, 7 seconds, 8 seconds, 9 seconds, 10 seconds, 15 seconds, 30 seconds, 45 seconds, 1 minutes, or more or any other suitable value in a range of, e.g., 1 second to 1 hour.

In some embodiments, the sensor data may be provided to software and/or hardware for edge analytics/weight matrix 320. In some embodiments, the edge analytics/weight matrix 320 may include, e.g., an edge analytics AI model. In some embodiments, each of the sensor S1 130 through sensor Sn 132 may output sensor data to edge analytics/weight matrix 320 that is configured to process the sensor data according to the measurements measures by each of the sensor S1 130 through sensor Sn 132. Thus, the edge analytics AI model of the ML Model/weight matrix 320 may be customized for a particular measurement type. Additionally, or alternatively, the edge analytics/weight matrix 320 may be configured to process the sensor data based on the equipment associated with each of the sensor S1 130 through sensor Sn 132. In some embodiments, the edge analytics AI model may be configured and trained for event detection, event classification, or other output based on the measurement(s) and/or equipment(s). For example, the edge analytics AI model may be specifically trained to detect anomalies in electrical use for an HVAC system or other appliance and/or electrically powered equipment measured by one or more of the sensor S1 130 through sensor Sn 132. Similarly, the edge analytics AI model may be specifically trained to detect a sound of a particular set of sounds in audio recordings collected by one or more of the sensor S1 130 through sensor Sn 132.

In some embodiments, the output of a classification layer and/or regression layer of the edge analytics AI model may include a value, such as, e.g., a probability value, a confidence score, or other suitable indication of a state or likelihood of a particular state of the equipment associated with the sensor S1 130 through sensor Sn 132 to detect whether an event has occurred ("event detection"). Thus, the value may represent probability of a state and/or probability of an occurrence of event as a result of a state of the equipment based on learned parameters of the classification and/or regression layer.

In some embodiments, the value may be thresholded using threshold logic 330. In some embodiments, the threshold logic 330 may apply one or more thresholds to the value. The one or more thresholds may include a threshold value indicating whether the value represents a state or event having occurred. For example, the threshold logic 330 may apply a detection threshold for an anomaly detection AI model, where a value above the detection threshold indicates a confidence sufficient to label the sensor data as indicating an event (such as an anomaly, a particular sound, etc.), and a value below the threshold indicates a confidence insufficient to label the sensor data as indicating the event. In some embodiments, an upper detection threshold and lower detection threshold may be employed, where values above the upper detection threshold may indicate confidence sufficient for the event label, values below the lower detection threshold indicate confidence insufficient for the event label (and thus indicative of a "no event" label), and values below the upper detection threshold and above the lower detection threshold indicate a confidence insufficient for an event label and insufficient for a no event label, and thus indicating a "possible event" label.

In some embodiments, the edge analytics AI model may include a classification layer configured for multi-class classification to classify the sensor data as having a particular type of event ("event classification"). Thus, the classification layer may output multiple values, where each value is indicative of a probability of occurrence of a particular type of event of a set of types of events. The threshold logic 330 may apply the one or more thresholds to each value to determine whether there is sufficient confidence to indicate the occurrence of each type of event, and apply a label indicative of each type of event for which there is sufficient confidence. Where multiple types of events and/or no types of events are indicated as having occurred, or where multiple types of events and/or no types of events are indicated as possible, the threshold logic 330 may determine there is insufficient confidence for a particular type of event. Alternatively, the threshold logic 330 may first rank each type of event by its corresponding value, and select the highest ranked type of event as the most likely type of event to have occurred. The threshold logic 330 may then apply the threshold(s) to the highest ranked type of event to determine where there is sufficient confidence to apply a label indicating the highest ranked type of event has occurred or is possible to have occurred. Alternatively, multiple event types can be associated with an event and passed through the system.

In some embodiments, the edge analytics AI model may include a two layer architecture for both event detection and event classification, where a first layer is used for event detection to output a value indicative of a probability of an event having occurred, and a second layer is used for event classification to output multiple values indicative of a probability that the event is each type of event. The threshold logic 330 may then apply the thresholds to determine whether the event is likely a particular type of event. If the threshold logic 330 indicates that the event does not have sufficient probability to be any particular type of event, the event may be classified as an anomalous event. Alternatively, multiple event types can also be associated with an event.

In some embodiments, the label as a result of the threshold logic 330, along with the sensor data, may be passed to analytics output logic 340 where the results are prepared to be published to the cloud computing. To prepare the data, a set of the data is selected starting a predetermined amount of time prior to the event, the period of time during the event, and a predetermined period of time after the event, for the sensors associated with the event. Timestamps, event data, and any additional information on system state, are attached and is formatted in a format compatible, such as json, and published using MQTT or similar technique. AI results that fit predetermined trained models can be acted upon locally or optionally output simply as to what sensor processed the event, what event occurred, at what confidence, and at what time. There may not be the need to publish the event or any raw data for the event to the cloud analytics thereby reducing the data flow to the cloud.

In the case that the output from the analytics AI 320 and threshold logic 330 is that an event was detected or possible and that the event is an anomalous event, analytics output logic 340 may output event details and raw data for the anomaly to the cloud computing platform 400. In some embodiments, the event details may include, e.g., a sensor device identifier identifying the sensor of the sensor S1 130 through sensor Sn 132 associated with the sensor data, a data attribute indicating a date associated with the segment of sensor data associated with the event, a time attribute indicating a time associated with the segment of sensor data associated with the event, a location attribute indicative of a location associated with the sensor S1 130 through sensor Sn 132, a hardware device attribute identifying the equipment or other hardware device associated with the segment of sensor data, a user attribute identifying a user or customer or owner associated with the hardware device/equipment, among other attributes or any combination thereof. In some embodiments, the event details and raw sensor data are published to the cloud computing platform 400 by way of the network 120 (e.g., the Internet) such as by using a suitable API and/or messaging/transport protocol. The publications are directed to the cloud computing IoT Hub 410 where they are received and routed 420. Data may be routed to data storage 430 and acted on by cloud analytics 440 and the AI machine Learning ML model/matrix 450. For the case where the event is thresholded 330 with a high probability of being classified, only the classification data may be sent through data processing chain 400 to be output as a recognized event 490. For the case where the event is not recognized by threshold 330, e.g., with high probability (a probability greater than, e.g., 0.4, 0.5, 0.6, 0.7, or other threshold probability value), event details and data is routed to data storage 430 and data analytics 440. Thus, the second iteration of prediction using the AI machine Learning ML model/matrix 450 in a cloud environment enables the use of a more sophisticated version of the model (e.g., requiring greater computing resources than would be available on a sensor), more up-to-date training, or a combination thereof in order to provide greater probability in a classification relative to the edge analytics AI model. Data processor 440 using ML model 450 may then be used to classify the anomaly.

For example, the cloud analytics 440, ML Model Matrix, and Thresholding logic 470 processes are analogous to the edge analytics/weight matrix 320 and threshold logic 330 processes performed in the edge electronics. In some embodiments, the cloud analytics 440 and ML model/matrix 450 may be a more recently trained model, a model with a larger classification/regression layer than the edge analytics/weight matrix 320 (e.g., more nodes, more weights, more trees in a Random Forest model, etc.). In some embodiments, the event detection and the event classification may classify the anomaly type for use in helping to guide the user of application 500.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neural network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the output from the threshold logic 470 indicates a confidence in the event being a recognized event 480 or unrecognized event 490. Recognized events 480 may be simply logged and the log output or updated to a notification and labeling application 500 running on one or more mobile devices associated with one or more users. The log in this case may simply contain the output as to what sensor processed the event, what event occurred, at what confidence, and at what time. This data can also be passed through the cloud computation functions 410-450 and 470 from analytics output logic 340.

In some embodiments, for unrecognized events 480 a data package 495 is prepared for the event and queued in an event queue 496 for later reference. In some embodiments, the event queue 496 may include a log of unrecognized events stored in the data store of the cloud computing platform 400. In some embodiments, the event data package 495 may be sent to the notification and labeling application 500.

In some embodiments, the event data package 495 may include, e.g., event details may include, e.g., a sensor device identifier identifying the sensor of the sensor S1 130 through sensor Sn 132 associated with the sensor data, a data attribute indicating a date associated with the segment of sensor data associated with the event, a time attribute indicating a time associated with the segment of sensor data associated with the event, a location attribute indicative of a location associated with the sensor S1 130 through sensor Sn 132, a hardware device attribute identifying the equipment or other hardware device associated with the segment of sensor data, a user attribute identifying a user or customer or owner associated with the hardware device/equipment, among other attributes or any combination thereof.

In some embodiments, the at least one user may include one or more service professionals registered with the cloud computing platform 400. In some embodiments, the cloud computing platform 400 may maintain a library of user profiles for each service professional registered to conduct maintenance, repairs, servicing, inspection, and other tasks for the equipment or other hardware device associated with sensors, such as the sensors S1 130 through Sn 132. The registered service professionals may be registered as a professional servicer with a professional servicer profile indicating expertise in, e.g., all equipment/hardware, a set of equipment/hardware, a particular type or model of equipment/hardware, etc., via one or more hardware device expertise attributes. In some embodiments, the professional servicer profile may include a registered location associated with a particular geographic area, among other registration information or any combination thereof.

In some embodiments, the cloud computing platform 400 may use the hardware device attribute of the event data package 495 to identify one or more professional servicers having qualifications and/or expertise for performing service on the hardware device of the anomalous event, for example by comparing the hardware device attribute to hardware device expertise attribute(s) in each professional servicer profile. In some embodiments, the qualified professional servicers may then be filtered by location to ensure that the professional servicer assigned to the event data package 495 operates within the geographic area of the event data package 495. In some embodiments, to do so, the location attribute of the event data package 495 may be compared with the registered location attribute(s) of the professional servicer profile of each qualified professional servicer. Thus, the event data, including the location attribute, hardware device attribute, among other data may be used to identify qualified service professionals able to respond to the event, whether it is recognized or not, according to the registration information. Accordingly, in some embodiments, professional servicers may be assigned to perform a site diagnosis to address the event data package 495 via physical/manual inspection. Thus, the cloud computing platform 400 may publish, broadcast, or otherwise provide the event data package 495 to the notification and labeling application 500 associated with the qualified service professionals. Application 500 may then post the event and the need for a site visit as a service opportunity the qualified service professionals that are operating in the region for the posted service need, e.g., based on a location reported by the application 500 to the cloud computing platform 400, an operating location logged for the individual service professional and/or the employer of the service professional, or any suitable combination thereof. The service professional can then elect to accept the service job, whereby its status is updated on all applications 500 showing the service event need, and change a status of the service job to accepted or pending repair or other suitable status indicator. For completed event repair notifications, the notification may be removed from the application 500 repair posting list including from the application 500 of each service professional to which the notification was provided.

In some embodiments, application 500 allows the service professional to indicate a service is being performed via a suitable user interface (UI) selection. The change in status based on UI selection may trigger data from Sensor 300 with edge AI electronics to be captured prior to the repair and after the repair. The repair and/or nature of the repair may be provided as a label using a suitable user selection or other user input to the UI of the application 500. As data from before the repair has a high probability of be representative of the state for repair label, and data from after the repair similarly has a high probability of showing normal data, the repair event provides an opportunity to collect labeled data for the required repair state.

In some embodiments, the term "mobile computing device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

In some embodiments, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In the case of an unrecognized event, data package 495 passed from cloud computing platform 400, through event queue 496, and is received by the notification and labeling application 500. Application 500 provides a number of interfaces for the unrecognized event. First, an anomalous event interface 560 is provided. Anomalous event interface 560 receives information related to the event as to support the location, diagnostics, and identification of the source of the event. For example, data package 495 may be the result of the AI process for a residential Heating, ventilation, and air conditioning (HVAC) system monitoring data showing an event that is not recognized by the AI training model. In this case, the notification and labeling application 500 receives data package 495, 496, which may contain, for example, the location of the HVAC system, the date and time for the event, and a representation of the data that was received that triggered the event notification service or service request.

In some embodiments, the user of the application 500 may be a registered service professional registered as an HVAC professional, who can then, accept the service request, visit the site 550, with the assistance of the data package 540 to perform a site diagnostic 530 to diagnose the event or any other event associated, and or repair the equipment. In some embodiments, the user may respond to the event or service notification of the event data package 495, or may respond to a call or other communication from the owner of the associated equipment, or may respond to routine servicing of the equipment.

In some embodiments, unrecognized events would be sent to multiple HVAC professionals before the creation of a potential service request. Remote diagnostic using event data would be performed by the users. The answers from multiple users would confirm or deny the need for a service request and help with the labeling of unrecognized events. An onsite visit would be used as final confirmation of labeling unrecognized event data.

In some embodiments, upon going to the equipment to perform servicing, the user may use the notification and labeling application 500 to input the site diagnosis 530. The site diagnosis 530 may be in response to the event data package 495, or may be a diagnosis of an event without having been notified with the event data package 495. In some embodiments, the user may physically/manually inspect the equipment and discern whether an event has occurred and/or is occurring in association with the equipment. In some embodiments, the site diagnosis 530 may include a cause of the event, such as, e.g., a fault, a broken part, a software bug or glitch, a power failure, or any other cause for an event or any combination thereof.

In some embodiments, the notification and labelling application 500 may include a diagnosis user interface for inputting the site diagnosis 530, including diagnosis details associated with the event. For example, the user may input a service time and/or date attribute associated with the site diagnosis, a service location attribute associated with the site diagnosis 530, an occurrence of an event based on the site diagnosis 530, a type of event based on the site diagnosis 530, a type of event based on the site diagnosis, an serviced hardware device attribute (e.g., model, model number, serial number, part number, type of equipment/hardware, etc.), among other diagnosis details or any combination thereof. In some embodiments, the user may input the diagnosis details using text input, selection from a prepopulated list of options, or any other input method or any combination thereof.

In some embodiments, the notification and labeling application 500 may include user input options for diagnosis data fields for the event and/or event type and/or event cause. In some embodiments, the user input options may include a selectable list having a set of labels that correspond to the labels that the ML model/matrix 450 is trained to output. Where the service professional diagnoses an event as being of a type or having a cause for which the ML model/matrix 450 is trained to output, the service professional may select the associated option(s) from the list. Where the service professional diagnoses the event as being of a type or having a cause for which the ML model/matrix 450 is not trained to output, the service professional may instead input, via text input, a descriptor for the event that indicates the type/cause of the event. In some embodiments, the list may include a hierarchical set of labels where the hierarchy of labels relates to a level of generality of each label, such as type, sub-type, sub-sub-type, and so on, or cause, sub-cause, sub-sub-cause, etc., or any other label, sub-label, sub-sub-label, etc. hierarchy to form a hierarchical tree of types of events and/or types of causes, with a lowest level being a most specific descriptor with which to label the event. Thus, in some embodiments, the hierarchical list may be combined with text input such that the service professional may select the lowest level in the hierarchy for which a label exists that matches the site diagnosis 530, and where the site diagnosis 530 is more specific than the lowest level in the hierarchy for which a matching label exists, the service professional may input, e.g., via text input, user selection, or other user interaction to provide a more specific descriptor. Thus, based on the site diagnosis 530, the service professional may use the notification and labeling application 500 to perform event labeling 520 and create a new label 510 where a matching label does not exist.

In some embodiments, the label provided by the service professional may be linked to the diagnosis details and published, broadcasted or otherwise provided to the cloud computing platform 400 as a service record. In some embodiments, the service record may be provided to the cloud computing platform 400 with or without reference to the event data package 495. In some embodiments, the cloud computing platform 400 may identify the event data package 495 associated with the service record. To do so, in some embodiments, the cloud computing platform 400 may use the diagnosis details of the service record to query the event queue 496 to identify the associated event data package 495. For example, the cloud computing platform 400 may query the event queue 496 using the time, date, location and/or equipment/hardware identifier to identify event data packages 495 having a time attribute, date attribute, location attribute and/or hardware device attribute that match the time, date, location and/or equipment/hardware identifier, respectively. Alternatively, or in addition, the cloud computing platform 400 may determine a similarity metric that measures the similarity between the diagnosis details and each event data package 495 in the event queue 496. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, where the service record references the event data package 495, the cloud computing platform 400 may omit the matching to the event data package 495 in the event queue 496 and directly access the event data package 495 based on the reference. In some embodiments, the reference may include, e.g., a resource locator (e.g., uniform resource locator (URL), etc.), a memory address, a network address, a file or folder identifier associated with the event data package 495, or other suitable reference or any combination thereof.

In some embodiments, the new label 510 may be linked to the event data package 495 and input into the ML model/matrix 450 to retrain the ML model/matrix 450. In some embodiments, the retrained ML model/matrix 450 can then be downloaded as updates to the edge analytics/weight matrix 320 to enable additional AI event recognition and discrimination capabilities.

Figure 4:
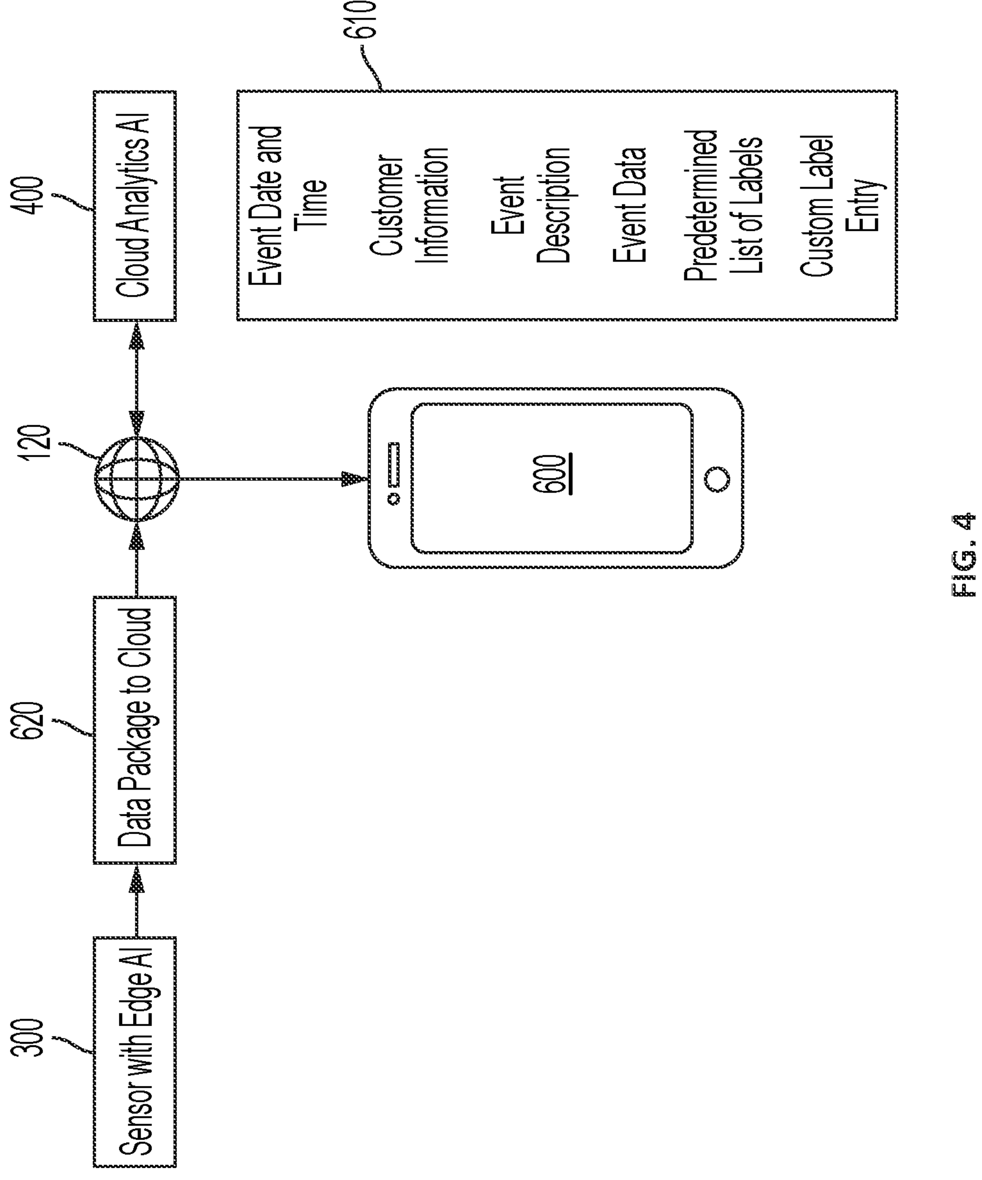
FIG. 4 is a diagram illustrating an application for facilitating the identification and labelling of anomalous data, in accordance with one or more embodiments of the present disclosure.

FIG. 4 further illustrates the application function for the notification and labeling application. Sensor 300 with edge AI electronics detects an event and sends an event data package 620 to cloud computing platform 400 through the network 120. Event data may be processed further in the cloud analytics as described above. The cloud analytics may output a data package to the notification and labeling application FIG. 3 500 and FIGS. 4 600 and 610. FIG. 4 600 illustrate a smart phone device capable of running applications. Data from the cloud computing platform 400 can be transmitted to application 600 for the purpose of logging normal events or for providing notifications as to anomalous events as would be distinguished by the contents of the publication. Information such as the event date and time, customer information, event description, event data could be provided. As described above and in FIG. 3, a predetermined list of labels as well as a field for custom label entry would support easy entry of a label for the event once diagnosed.

Figure 5:
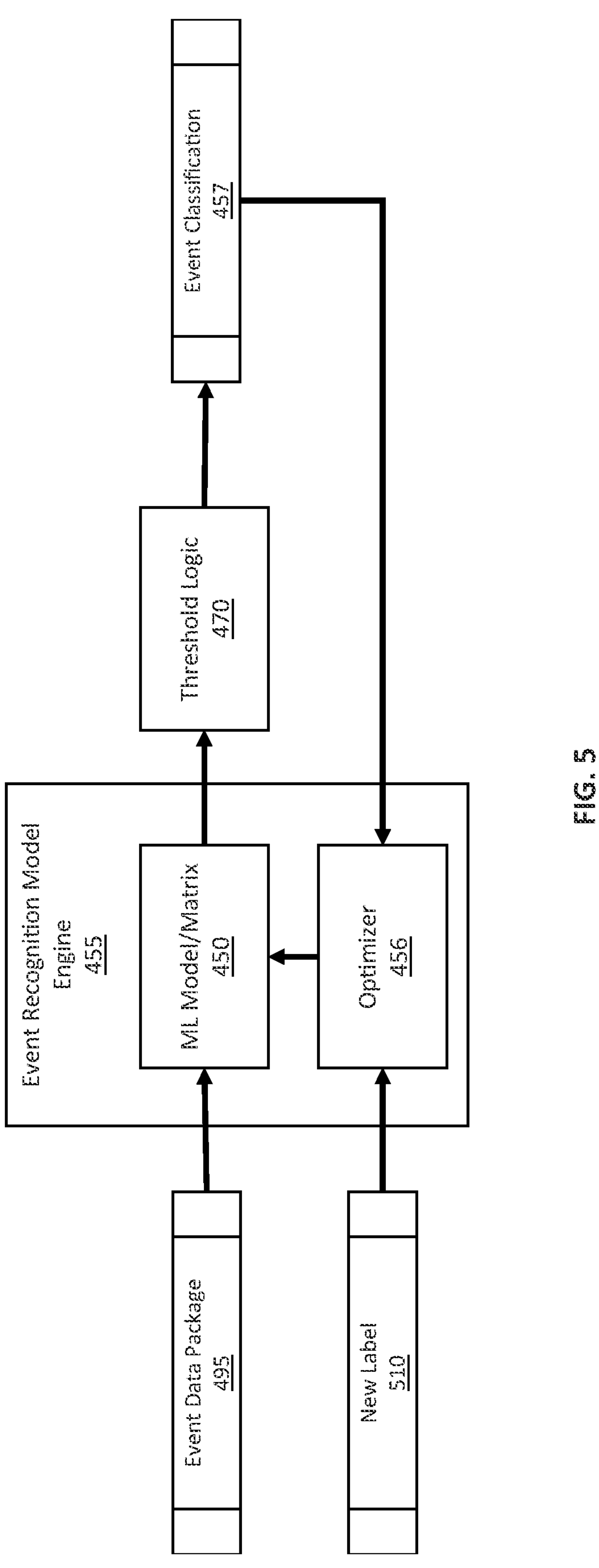
FIG. 5 is a diagram illustrating an anomaly classification machine learning model and training thereof in accordance with one or more embodiments of the present disclosure.

FIG. 5 is a diagram illustrating an anomaly classification machine learning model and training thereof in accordance with one or more embodiments of the present disclosure.

In some embodiments, the event recognition model engine 455 may utilize the ML Model/matrix 450 to predict a type and/or cause of an event associated with the event data package 495, including the sensor data.

In some embodiments, the ML Model/matrix 450 ingests a sensor data that encodes measurements representative of the sensor data from the sensor S1 130 through sensor Sn 132. In some embodiments, the ML Model/matrix 450 processes the sensor data with parameters to produces a prediction of event classification 457. In some embodiments, the parameters of the ML Model/matrix 450 may be implemented in a suitable machine learning model including a classifier machine learning model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the ML Model/matrix 450 may advantageously include a random forest classification model.

In some embodiments, the ML Model/matrix 450 processes the measurements represented in the sensor data by applying the parameters of a classification layer to produce a model output vector and/or one or more probability values indicative of a type and/or cause of the event. In some embodiments, the model output vector may be decoded to generate one or more labels indicative of the event classification 457 by decoding to reveal the one or more probability values, e.g., between 0 and 1, where each probability value indicates a degree of probability that a particular label correctly classifies the sensor data of the event data package 495. In some embodiments, the ML Model/matrix 450 may test each probability value against a respective probability threshold the threshold logic 470 as described above. In some embodiments, each probability value has an independently learned and/or configured probability threshold. Alternatively or additionally, in some embodiments, one or more of the probability values of the model output vector may share a common probability threshold. In some embodiments, where a probability value is greater than the corresponding probability threshold, the event data package 495 is labeled according to the corresponding label. For example, the probability threshold can be, e.g., greater than 0.5, greater than 0.6, greater than 0.7, greater than 0.8, greater than 0.9, or other suitable threshold value. Therefore, in some embodiments, the ML Model/matrix 450 may produce the event classification 457 for a particular event data package 495 based on the probability value(s) of the model output vector and the probability threshold(s).

In some embodiments, the parameters of the ML Model/matrix 450 may be trained based on known outputs, e.g., based on the service record associated with the event data package 495. For example, the event data package 495 may be paired with the new label 510 of the service record to form a training pair. In some embodiments, the sensor data of the event data package 495 may be provided to the ML Model/matrix 450 to produce the event classification 457. In some embodiments, an optimizer 456 associated with the ML Model/matrix 450 may then compare the event classification 457 with the new label 510 of a training pair to determine an error of the predicted label. In some embodiments, the optimizer 456 may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, based on the error, the optimizer 456 may update the parameters of the ML Model/matrix 450 using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the optimizer 456 may update the parameters of the ML Model/matrix 450 based on the error of predicted labels in order to train the ML Model/matrix 450 to model the correlation between event data package 495 and event classification 457 in order to produce more accurate labels of event data package 495.

Figure 6:
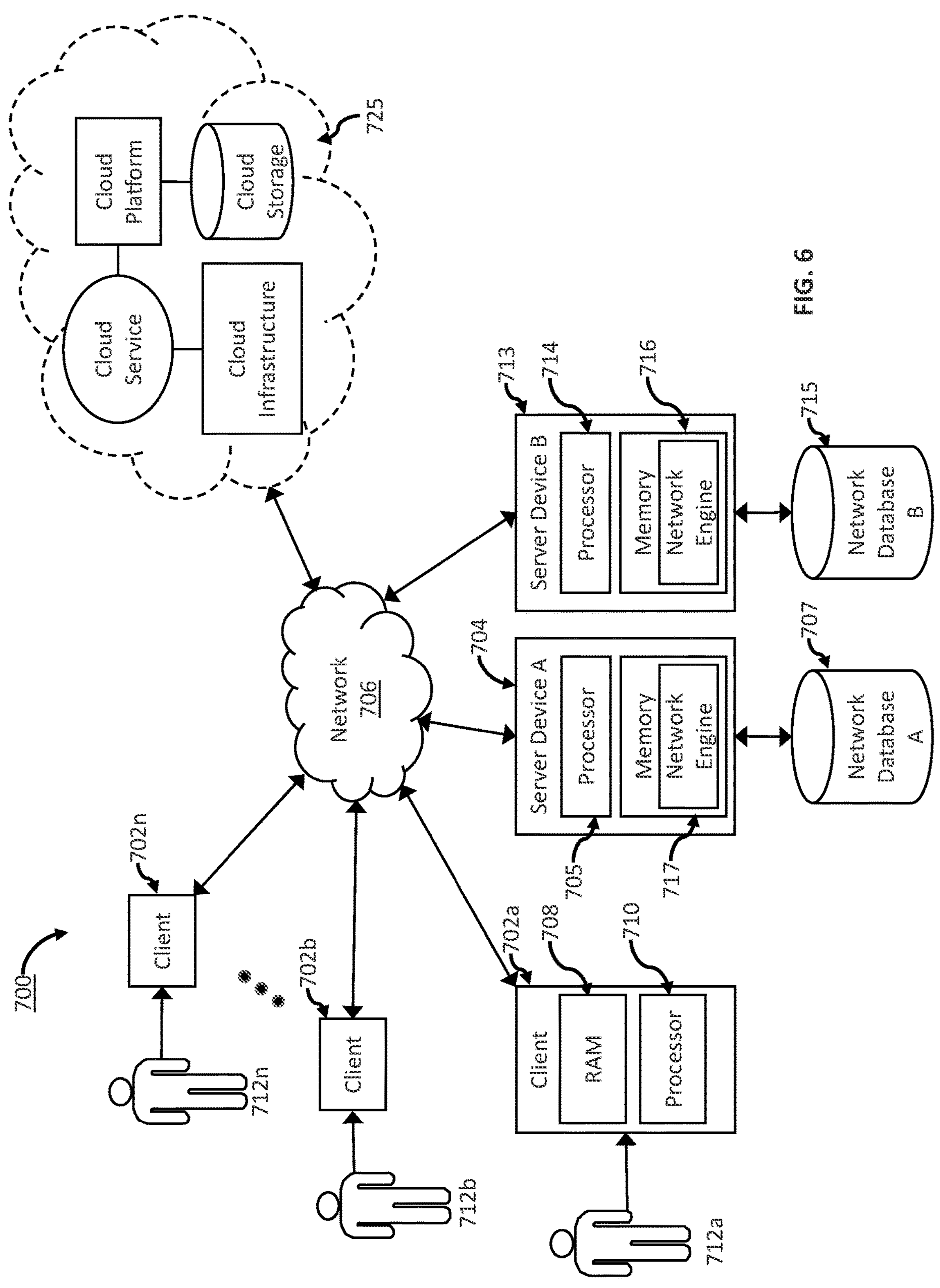
FIG. 6 depicts a block diagram of another exemplary computer-based system and platform for application enhanced data labeling in accordance with one or more embodiments of the present disclosure.

FIG. 6 depicts a block diagram of another exemplary computer-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client devices 702*a*, 702*b* through 702*n* shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client device 702*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

Figure 7:
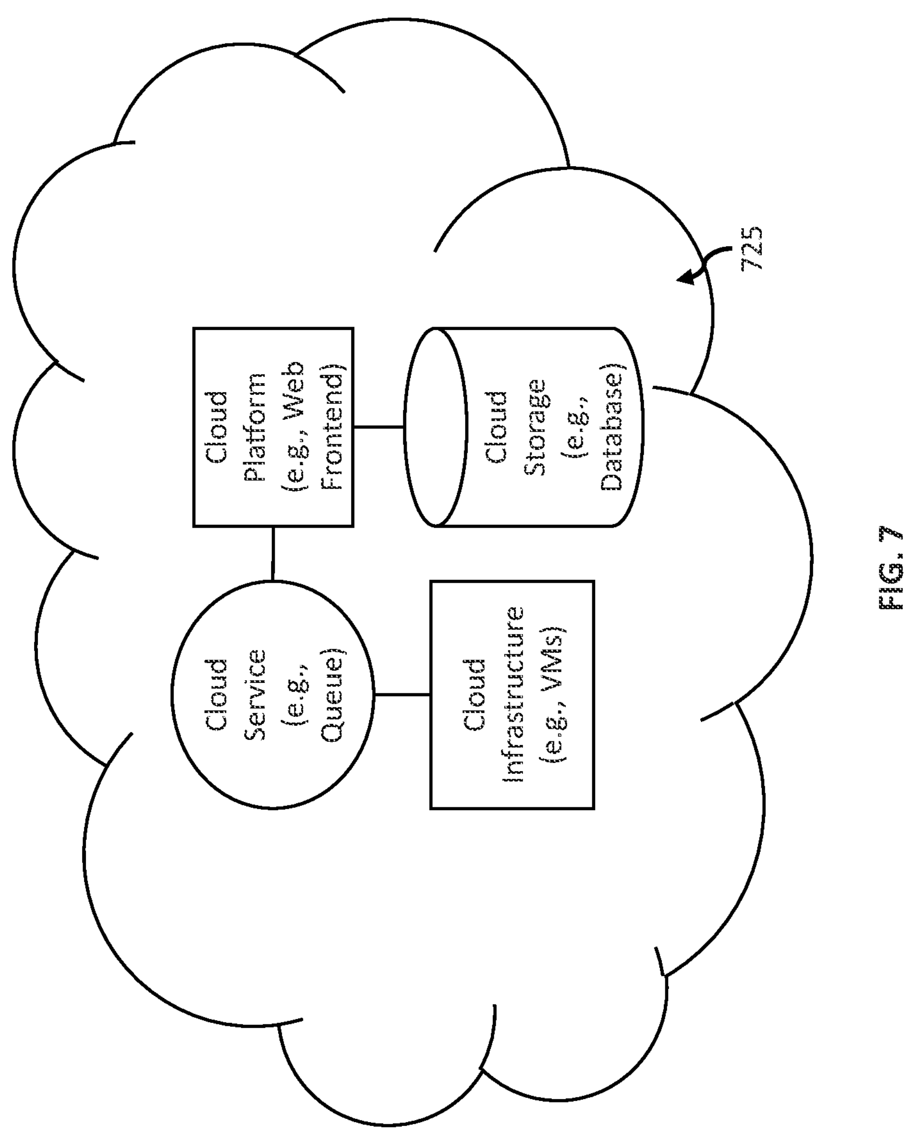
FIG. 7 depicts illustrative schematics of an exemplary implementation of the cloud computing/architecture(s) in which embodiments of a system for application enhanced data labeling may be specifically configured to operate in accordance with some embodiments of the present disclosure.

In some embodiments, client devices 702*a* through 702*n* may also comprise a number of external or internal devices such as a mouse, a CD-ROM, DVD, a physical or virtual keyboard, a display, or other input or output devices. In some embodiments, examples of client devices 702*a* through 702*n* (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, client devices 702*a* through 702*n* may be specifically programmed with one or more application programs in accordance with one or more principles/methodologies detailed herein. In some embodiments, client devices 702*a* through 702*n* may operate on any operating system capable of supporting a browser or browser-enabled application, such as Microsoft™, Windows™, and/or Linux. In some embodiments, client devices 702*a* through 702*n* shown may include, for example, personal computers executing a browser application program such as Microsoft Corporation's Internet Explorer™, Apple Computer, Inc.'s Safari™, Mozilla Firefox, and/or Opera. In some embodiments, through the client devices 702*a* through 702*n*, users, 712*a* through 702*n*, may communicate over the exemplary network 706 with each other and/or with other systems and/or devices coupled to the network 706. As shown in FIG. 7, exemplary server devices 704 and 713 may include processor 705 and processor 714, respectively, as well as memory 717 and memory 716, respectively. In some embodiments, the server devices 704 and 713 may be also coupled to the network 706. In some embodiments, one or more client devices 702*a* through 702*n* may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
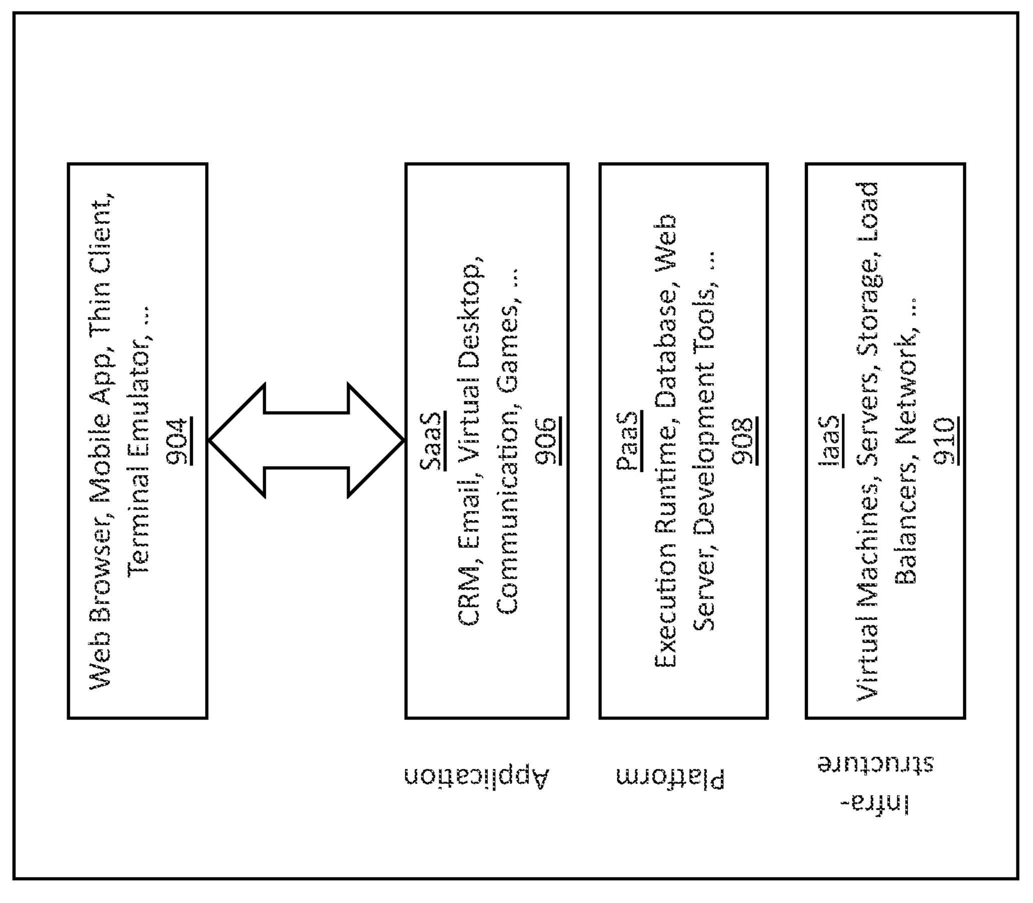
FIG. 8 depicts illustrative schematics of another exemplary implementation of the cloud computing/architecture(s) in which embodiments of a system for application enhanced data labeling may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 725 such as, but not limiting to: infrastructure a service (IaaS) 910, platform as a service (PaaS) 908, and/or software as a service (Saas) 906 using a web browser, mobile app, thin client, terminal emulator or other endpoint 904. FIGS. 7 and 8 illustrate schematics of exemplary implementations of the cloud computing/architecture(s) in which the exemplary systems of the present disclosure may be specifically configured to operate.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below.

As described herein, various embodiments of the exemplary inventive computer-based systems/platforms, the exemplary inventive computer-based devices, and/or the exemplary inventive computer-based methods or components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs). These examples are, of course, illustrative and not restrictive.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24). NET Framework; (25) Silverlight™; (26) Open Web Platform; (27) Oracle Database; (28) Qt™; (29) SAP NetWeaver™; (30) Smartface™; (31) Vexi™; (32) Kubernetes™; (33) Windows Runtime (WinRT™); (34) IBM i™; (35) IBM AIX™; (36) Microsoft DirectX™; (37) Eclipse Rich Client Platform or other suitable computer platforms or any combination thereof.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

receiving, by at least one processor, an event record from an edge hardware sensor;
- wherein the event record comprises event attributes comprising:
  - an anomalous sensor data segment comprising a time-series of sensor data that the edge hardware sensor,
  - a date attribute representing a date associated with the anomalous sensor data segment,
  - a location attribute representing a location associated with the edge hardware sensor, and
  - a hardware device attribute identifying a hardware device monitored by the edge hardware sensor;

utilizing, by the at least one processor, an event classification machine learning model to classify the event record according to at least one event classification of a set of event classifications based at least in part on a training event classification model parameters;

determining, by the at least one processor, that the at least one event classification comprises at least one probability value below a threshold probability value;

updating, by the at least one processor, an event queue to add the event record;

receiving, by the at least one processor, at least one service record from at least one service professional device associated with at least one service professional;
- wherein the at least one service record comprises diagnosis details comprising:
  - a service date attribute representing a service date associated with the service performed by the at least one service professional,
  - a service location attribute representing a service location associated with the service performed by the at least one service professional,
  - a serviced hardware device attribute identifying a serviced hardware device associated with the service performed by the at least one service professional,
  - a service performed attribute identifying the service performed, and a new event label indicating an event type, an event cause or both associated with the serviced hardware device;

accessing, by the at least one processor, the event queue;

determining, by the at least one processor, a similarity metric between:

the event attributes of the event record in the event queue, and the diagnosis details of the at least one service record;

determining, by the at least one processor, that the service performed by the service professional is associated with the event of the event record based at least in part on the similarity metric;

generating, by the at least one processor, a training pair comprising the event record and a training classification label comprising the new event label; and training, by the at least one processor, the event classification machine learning model based at least in part on the training pair to produce a retrained event classification machine learning model.

2. The method of claim 1, further comprising:

accessing, by the at least one processor, a professional servicer library comprising a plurality of professional servicer profiles;

wherein each professional servicer record of the plurality of professional servicer profiles comprises at least one hardware device expertise attribute specifying at least one hardware device for which a respective professional servicer is an expert;

determining, by the at least one processor, at least one professional servicer profile of the plurality of professional servicer profiles based at least in part on the hardware device attribute of the event record and the at least one hardware device expertise attribute of each professional servicer profile;

determining, by the at least one processor, at least one user device associated with the at least one professional servicer profile; and instructing, by the at least one processor, the at least one user device to render at least one site diagnosis interface representing at least one site diagnosis assignment to service the hardware device monitored by the edge hardware sensor;

wherein the at least one site diagnosis interface comprises a user input field to enable the at least one professional servicer associated with the at least one user device to input a new event label classifying the event record.

3. The method of claim 2, further comprising:

determining, by the at least one processor, at least one location associated with the at least one user device; and instructing, by the at least one processor when the at least one location is within a predetermined radius of the location attribute, the at least one user device to render the at least one anomalous event interface.

4. The method of claim 1, wherein the at least one service record references the event in the event queue.

5. The method of claim 1, wherein the at least one service record comprises at least one of:

a text input label representing the new event label by text input, or a label selection from a list of labels.

6. The method of claim 5, wherein the list of labels is a hierarchical list with at least one label and at least one sub-label.

7. The method of claim 1, further comprising updating, by the at least one processor, at least one sensor event classification machine learning model with the retrained event classification machine learning model, wherein the at least one sensor event classification machine learning model is stored by electronics associated with the edge hardware sensor.

8. A non-transitory computer readable medium having software instructions stored thereon, the software instructions configured to cause at least one processor to perform steps comprising:

receiving an event record from an edge hardware sensor;

wherein the event record comprises event attributes comprising:

an anomalous sensor data segment comprising a time-series of sensor data that the edge hardware sensor, a date attribute representing a date associated with the anomalous sensor data segment, a location attribute representing a location associated with the edge hardware sensor, and a hardware device attribute identifying a hardware device monitored by the edge hardware sensor;

utilizing an event classification machine learning model to classify the event record according to at least one event classification of a set of event classifications based at least in part on a training event classification model parameters;

determining that the at least one event classification comprises at least one probability value below a threshold probability value;

updating an event queue to add the event record;

receiving at least one service record from at least one service professional device associated with at least one service professional;

wherein the at least one service record comprises diagnosis details comprising:

a service date attribute representing a service date associated with the service performed by the at least one service professional, a service location attribute representing a service location associated with the service performed by the at least one service professional, a serviced hardware device attribute identifying a serviced hardware device associated with the service performed by the at least one service professional, a service performed attribute identifying the service performed, and a new event label indicating an event type, an event cause or both associated with the serviced hardware device;

accessing the event queue;

determining a similarity metric between:

the event attributes of the event record in the event queue, and the diagnosis details of the at least one service record;

determining that the service performed by the service professional is associated with the event of the event record based at least in part on the similarity metric;

generating a training pair comprising the event record and a training classification label comprising the new event label; and training the event classification machine learning model based at least in part on the training pair to produce a retrained event classification machine learning model.

9. The non-transitory computer-readable medium of claim 8, further comprising software instructions configured to cause at least one processor to perform steps comprising:

accessing a professional servicer library comprising a plurality of professional servicer profiles;

wherein each professional servicer record of the plurality of professional servicer profiles comprises at least one hardware device expertise attribute specifying at least one hardware device for which a respective professional servicer is an expert;

determining at least one professional servicer profile of the plurality of professional servicer profiles based at least in part on the hardware device attribute of the event record and the at least one hardware device expertise attribute of each professional servicer profile;

determining at least one user device associated with the at least one professional servicer profile; and instructing the at least one user device to render at least one site diagnosis interface representing at least one site diagnosis assignment to service the hardware device monitored by the edge hardware sensor;

wherein the at least one site diagnosis interface comprises a user input field to enable the at least one professional servicer associated with the at least one user device to input a new event label classifying the event record.

10. The non-transitory computer-readable medium of claim 9, further comprising software instructions configured to cause at least one processor to perform steps comprising:

determining at least one location associated with the at least one user device; and instructing when the at least one location is within a predetermined radius of the location attribute, the at least one user device to render the at least one anomalous event interface.

11. The non-transitory computer-readable medium of claim 8, wherein the at least one service record references the event in the event queue.

12. The non-transitory computer-readable medium of claim 8, wherein the at least one service record comprises at least one of:

a text input label representing the new event label by text input, or a label selection from a list of labels.

13. The non-transitory computer-readable medium of claim 12, wherein the list of labels is a hierarchical list with at least one label and at least one sub-label.

14. The non-transitory computer-readable medium of claim 8, further comprising software instructions configured to cause at least one processor to perform steps comprising updating at least one sensor event classification machine learning model with the retrained event classification machine learning model, wherein the at least one sensor event classification machine learning model is stored by electronics associated with the edge hardware sensor.

15. A system comprising:

at least one processor configured to execute software instructions, wherein the software instructions, when executed, cause the at least one processor to perform steps to:

receive an event record from an edge hardware sensor;

wherein the event record comprises event attributes comprising:

an anomalous sensor data segment comprising a time-series of sensor data that the edge hardware sensor, a date attribute representing a date associated with the anomalous sensor data segment, a location attribute representing a location associated with the edge hardware sensor, and a hardware device attribute identifying a hardware device monitored by the edge hardware sensor;

utilize an event classification machine learning model to classify the event record according to at least one event classification of a set of event classifications based at least in part on a training event classification model parameters;

determine that the at least one event classification comprises at least one probability value below a threshold probability value;

update an event queue to add the event record;

receive at least one service record from at least one service professional device associated with at least one service professional;

wherein the at least one service record comprises diagnosis details comprising:

a service date attribute representing a service date associated with the service performed by the at least one service professional, a service location attribute representing a service location associated with the service performed by the at least one service professional, a serviced hardware device attribute identifying a serviced hardware device associated with the service performed by the at least one service professional, a service performed attribute identifying the service performed, and a new event label indicating an event type, an event cause or both associated with the serviced hardware device;

a service performed attribute identifying the service performed;

access the event queue;

determine a similarity metric between:

the event attributes of the event record in the event queue, and the diagnosis details of the at least one service record;

determine that the service performed by the service professional is associated with the event of the event record based at least in part on the similarity metric;

generate a training pair comprising the event record and a training classification label comprising the new event label; and train the event classification machine learning model based at least in part on the training pair to produce a retrained event classification machine learning model.

16. The system of claim 15, wherein the software instructions, when executed, further cause the at least one processor to perform steps to:

access a professional servicer library comprising a plurality of professional servicer profiles;

wherein each professional servicer record of the plurality of professional servicer profiles comprises at least one hardware device expertise attribute specifying at least one hardware device for which a respective professional servicer is an expert;

determine at least one professional servicer profile of the plurality of professional servicer profiles based at least in part on the hardware device attribute of the event record and the at least one hardware device expertise attribute of each professional servicer profile;

determine at least one user device associated with the at least one professional servicer profile; and instruct the at least one user device to render at least one site diagnosis interface representing at least one site diagnosis assignment to service the hardware device monitored by the edge hardware sensor;

wherein the at least one site diagnosis interface comprises a user input field to enable the at least one professional servicer associated with the at least one user device to input a new event label classifying the event record.

17. The system of claim 16, wherein the software instructions, when executed, further cause the at least one processor to perform steps to:

determine at least one location associated with the at least one user device; and instruct when the at least one location is within a predetermined radius of the location attribute, the at least one user device to render the at least one anomalous event interface.

18. The system of claim 15, wherein the at least one service record comprises at least one of:

a text input label representing the new event label by text input, or a label selection from a list of labels.

19. The system of claim 18, wherein the list of labels is a hierarchical list with at least one label and at least one sub-label.

20. The system of claim 15, wherein the software instructions, when executed, further cause the at least one processor to perform steps to update at least one sensor event classification machine learning model with the retrained event classification machine learning model, wherein the at least one sensor event classification machine learning model is stored by electronics associated with the edge hardware sensor.

* * * * *